Feb. 13, 1951  H. S. IVORY ET AL  2,541,516
RETRACTOR MEANS FOR SURGICAL USE
Filed May 26, 1948  2 Sheets-Sheet 1
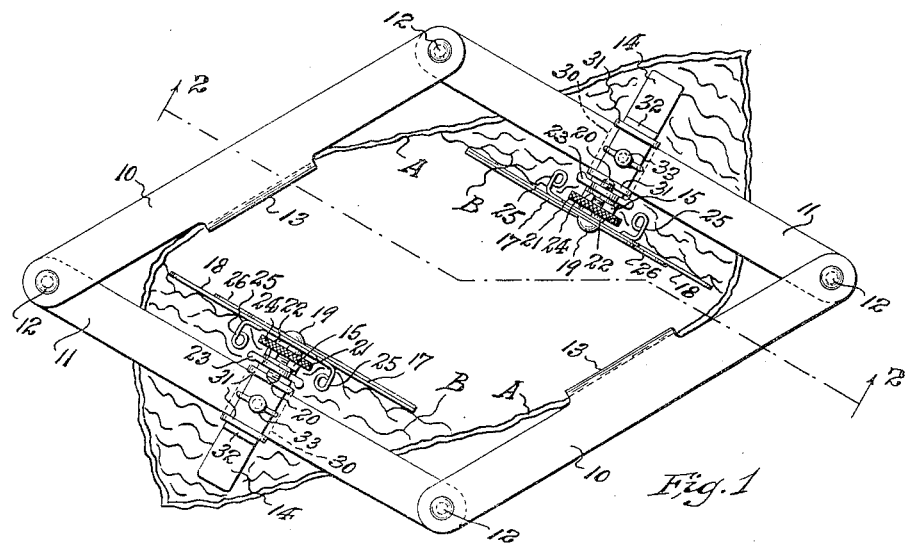
Fig. 1
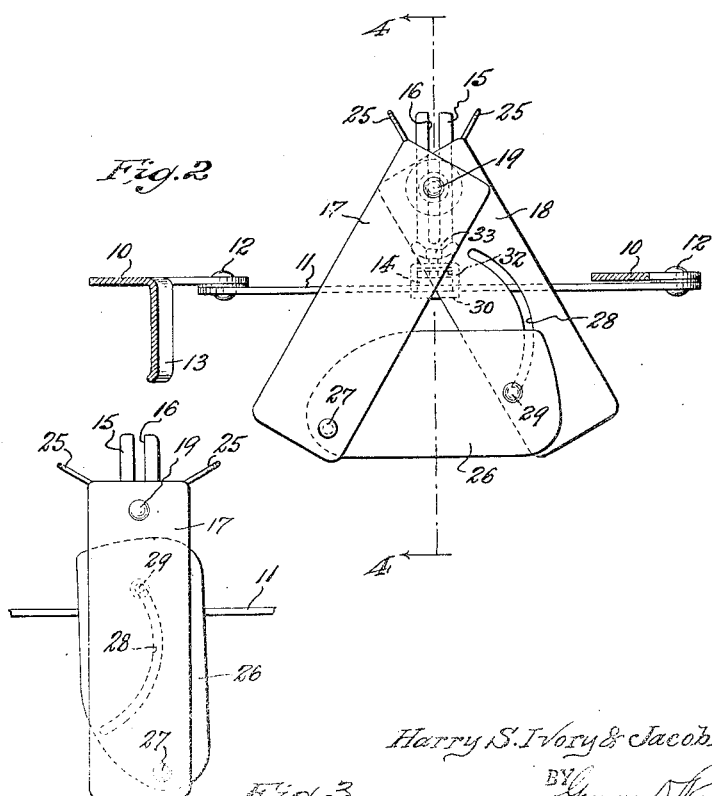
Fig. 2
Fig. 3
INVENTORS—
Harry S. Ivory & Jacob F. Loeffler,
BY George D. Richards,
Attorney Feb. 13, 1951 H. S. IVORY ET AL 2,541,516
RETRACTOR MEANS FOR SURGICAL USE
Filed May 26, 1948 2 Sheets-Sheet 2
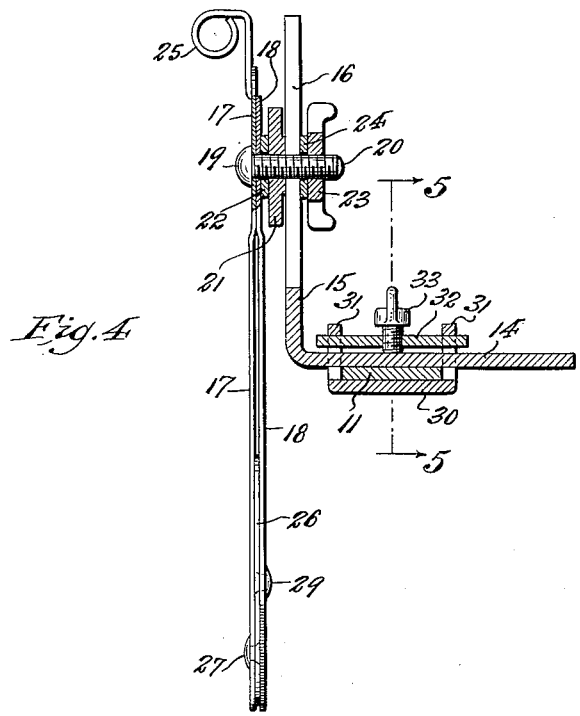
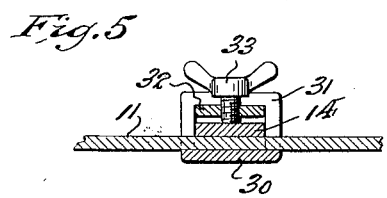
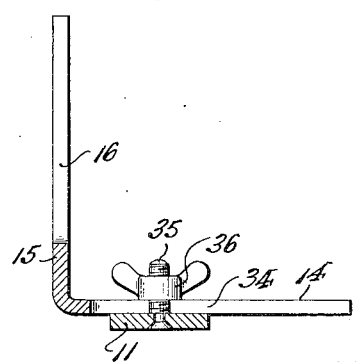
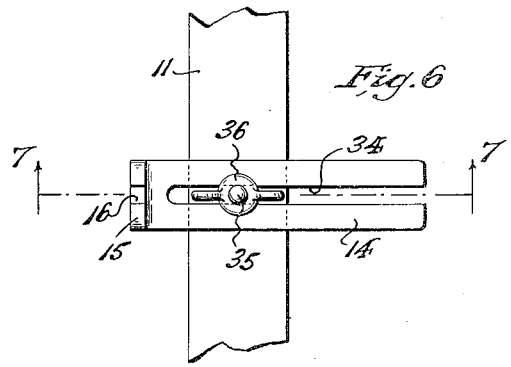
INVENTORS—
Harry S. Ivory & Jacob F. Loeffler,
BY George D. Richards,
Attorney Patented Feb. 13, 1951

2,541,516

UNITED STATES PATENT OFFICE 2,541,516

RETRACTOR MEANS FOR SURGICAL USE

Harry S. Ivory and Jacob F. Loeffler,
Point Pleasant, N. J.

Application May 26, 1948, Serial No. 29,258

6 Claims. (Cl. 128—20)

This invention relates to retractors which are principally designed for use in abdominal surgery; and the invention has reference, more particularly, to novel supplementary retractor means adapted to be mounted upon an incisional retractor whereby, when the latter is arranged to spread open an incision in the abdominal wall, said supplementary retractor means can be used to retract and wall off from the operative area internal structures which might otherwise obstruct access to said area.

Incisional retractors per se, when employed in abdominal surgery, are used to mechanically spread and hold open an incision made by the surgeon in the abdominal wall, whereby to expose the interior area or organ upon which the surgeon desires to operate. It not infrequently occurs that body structures beneath the abdominal wall must be pushed and held aside to expose the particular area or organ upon which the operation is to be performed. Heretofore such supplementary retraction of interior body structures has been attained by use of independent hand retractors, sometimes referred to as ribbon retractors. Such hand retractors must be applied and held in place by the hand of an assistant or nurse, and although such methods of supplementary retraction are helpful, they nevertheless involve disadvantages. For example, the hand retractor or hand of the assistant, by whom a hand retractor is manipulated, may not only impede the operating surgeon's view of the field of operation, but also, at times, more or less obstruct the surgeon's operational procedure. Again, the task of holding the supplementary retractor by hand is likely to tire the assistant, with risk that relaxation of the retracting effect or slipping of the supplementary retractor may occur at a critical moment during the performance of the operation, with resultant risk of accident or trauma. Additionally, the employment of hand retractors by an assistant prevents the assistant from performing other duties in aid of the operating surgeon, and thus makes necessary other assistance for such aid, which might otherwise be unnecessary if requirement for hand retraction was eliminated.

Having the above in view, it is an object of this invention to provide a novel construction of supplementary retractor means adapted to be attached to and to be supported in place by any usual type of incisional retractor, so that necessity for hand holding of supplementary retractor devices is avoided.

The invention has for another object to provide a novel supplementary retractor device for attachment to an incisional retractor, including means for adjusting the position of the same, both horizontally and vertically, relative to the incisional retractor.

Another object of the invention is to provide a novel supplementary retractor device for incisional retractors which includes an adjustable laterally expandible compound retractor blade structure.

Illustrative embodiment of the invention is shown in the accompanying drawings, in which:

Fig. 1 is a plan view of an incisional retractor as operatively expanded and applied to the margins of an abdominal wall incision, to spread and hold open the latter, and showing the novel supplementary retractor means operatively attached to said incisional retractor in operative position to extend within and below the incision, and with its retractor blade structure laterally expanded so as to engage and fend away body structure desired to be removed from the field of operation.

Fig. 2 is a transverse vertical sectional view, taken on line 2—2 in Fig. 1.

Fig. 3 is a front view of a supplementary retractor device showing its retractor blade structure in normal initial collapsed condition.

Fig. 4 is a vertical section, taken on line 4—4 in Fig. 2, but drawn on an enlarged scale, the retractor blade structure being shown in side edge elevation with parts in section.

Fig. 5 is a fragmentary cross sectional view, taken on line 5—5 in Fig. 4.

Fig. 6 is a detail plan view showing a modified form of means for affixing a supplementary retractor device to a bar of an incisional retractor; and Fig. 7 is a vertical sectional view, taken on line 7—7 in Fig. 6.

Similar characters of reference are employed in the hereinabove described views, to indicate corresponding parts.

In the drawings, an incisional retractor of one conventional form is shown, the same comprising two sets or pairs of parallel bars 10 and 11, which are connected one to another at meeting ends by pivotal joints 12, thus providing a quadrangular frame capable of expansion and contraction. One set of parallel bars, as e. g. the bars 10, are provided at their inner margins and intermediate their ends with dependent retractor fingers or hooks 13, by which opposed margins of an abdominal wall incision A may be engaged, so as to spread and hold open said incision when the retractor frame is expanded.

A novel supplementary retractor device according to this invention is adapted to be mounted upon and affixed to one or both of the other parallel bars 11 of the incisional retractor frame.

Each supplementary retractor device comprises an angular supporting bracket having a horizontal base portion 14, and a vertical post 15 upstanding from the inner end of said base portion. To mount the supporting bracket upon a bar 11 of the incisional retractor frame, the base portion 14 is footed upon and so as to extend across said bar 11, means, to be later herein described, being provided for adjustably affixing said base portion 14 to the bar 11. Said post 15 is provided with a longitudinal slot 16. Supported by the post 15, subject vertical adjustment thereon, is a retractor blade structure, which depends from the post in a vertical plane parallel to the front face of the latter, so as to extend downwardly through the interior of the incisional retractor frame.

In a preferred form thereof, the retractor blade structure comprises a pair of superposed rectangular blade members 17 and 18 of suitable width and length, the same being made of sheet metal or other suitable rigid sheet-like material. Extending rearwardly through the superposed upper end portions of the blade members 17 and 18 is a carrier bolt having a head 19 and a screw threaded shank 20. Said carrier bolt serves to both suspend said blade members and pivotally connect the same for relative lateral swinging movements.

A keeper nut 21 is threaded onto the bolt shank 20 behind the blade members 17—18, and interposed between the latter and said keeper nut 21 is a split spring washer, compression spring washer or like tensionally compressible means 22 for pressing the blade members 17 and 18 together and against the bolt head 19 when the keeper nut 21 is screwed home. The washer or like tensionally compressible means 22 effects such tensional thrust upon the blade members 17 as to frictionally interengage the same with each other and with the carrier bolt head 19. The friction thus induced between these parts, although permitting manually effected relative lateral swinging movements of said blade members whereby to expand or contract the supplementary retractor device, will never-the-less offer sufficient resistance to such movements as is calculated to prevent accidental displacement of the blade members from selected adjusted relative positions.

That portion of the bolt shank 20 which projects beyond the keeper nut 21 is adapted to be passed rearwardly through the slot 16 of the post 15. Screwed upon the free end portion of said bolt shank 20 is a clamp nut 23 for binding the supplementary retractor device to the post 15 in selected vertically adjusted supported position thereon. Preferably a split spring washer, compression spring washer or like tensionally compressible means 24 is interposed between the back of the post 15 and said clamp nut 23.

The blade members 17 and 18 are respectively provided at their upper ends with suitably shaped and directed finger pieces 25 by which the same may be manipulated.

The retractor blade structure of the supplementary retractor device may comprise merely the blade members 17 and 18, the peripheral shapes of which may be variously designed to best accommodate the device for desired lateral expansion and contraction. Preferably, however, as shown, the retractor blade structure includes a bridging blade member 26 which is cooperatively related to the lower free end portions of the main blade members 17 and 18, so as to extend transversely between said lower portions of the latter, when the same are laterally swung apart to expand the supplementary retractor device. Said bridging blade member 26 is pivotally connected by a pivoting element 27 to the lower end portion of one blade member, as e. g. to the blade member 17, and is slidably related to the lower end portion of the other blade member, as e. g. the blade member 18, in such manner as to be operated by the movements of the latter. To so operate the bridging blade member 26, the blade member 18 is provided with a suitably disposed arcuate cam slot 28, and the free end portion of said bridging blade member is provided with a rider stud 29 which is operatively engaged in said cam slot. When the compound blade structure thus provided is in a normal initial collapsed or contracted condition, as shown in Fig. 3, the blade members 17, 26 and 18 are folded together in substantially longitudinally aligned relation. To laterally expand the compound blade structure from such collapsed or contracted condition, the user engages the finger pieces 25 so as to press the same one toward the other, thereby imparting relative out swinging lateral movements to the blade members 17 and 18. Such out swinging movements of the blade members 17 and 18 causes their lower end portions to be laterally spread apart. During such out swinging movements of the blade members 17 and 18, the cam slot 28 of the blade member 18 exercises a camming action on the rider stud 29 of the bridging blade member 26, so that the latter is down swung to transverse extension between the spread apart lower end portions of the blade members 17 and 18 (see Fig. 2), thus expanding the supplementary retractor device to a desired operative condition.

Means is provided to mount a supplementary retractor device upon a supporting bar of the incisional retractor frame with which it is desired to be associated, so that the same is capable of adjustment horizontally to a desired inwardly offset relation to the side of the incisional retractor frame by which it is carried. One means for so mounting the supplementary retractor device (see Figs. 4 and 5 more particularly) comprises a clamp yoke 30 having upstanding perforate side members 31 which straddle a bar 11 of the incisional retractor frame. The base portion 14 of the supporting bracket, which carries the supplementary retractor device, is passed through said perforate side members 31 to engage upon and across said bar 11. Also passed through said perforate side members 31, so as to bridge the same above said base portion 14, is a thrust plate 32. Threaded through said thrust plate 32 is a set screw 33. It will be obvious, when the set screw 33 is loosened, that the base portion 14 of the supporting bracket may be moved in or out across the bar 11, whereby to determine a desired holding position of the supplementary retractor device, whereafter by screwing home the set screw, said base portion is immovably clamped to the bar 11 in the attained adjusted position.

An alternative means for adjustably affixing the base portion 14 of the supporting bracket, by which the supplementary retractor device is carried, to a bar 11 of the incisional retractor frame is shown in Figs. 6 and 7. In the arrangement provided by this alternative mounting means, the base portion 14 is provided with a longitudinal slot 34, and the bar 11 is provided with an upstanding screw-threaded stud 35 to project through said slot 34. The base portion 14 is fixed to the bar 11 in desired adjusted relation thereto and thereon by a wing nut 36 which is threaded onto said stud 35. It will be understood that the mounting means may take any other form best adapted for use with a particular design of incisional retractor which is desired to be equipped with the supplementary retractor means.

In the use of the supplementary retractor devices of this invention, one or more thereof may be mounted on the incisional retractor frame according to need. After an incision A has been made in the abdominal wall, and the incisional retractor frame has been applied thereto to spread open the incision, the supplementary retractor devices, with their blade structures in initially folded together or collapsed condition (as shown in Fig. 3), are vertically adjusted upon and fixed to the supporting posts 15 in selected position to predetermine desired extension of the lower portions of the blade structures into the interior of the abdomen, and also the blade structures are inwardly moved to an advanced position within the incisional retractor frame, so as to be suitably positioned to engage internal body structures B which are desired to be withdrawn from the area or part to be operated upon. The supplementary retractor blade structures, having been thus initially arranged, are then laterally expanded to spread the lower ends thereof (as shown in Figs. 1 and 2) to the extent required to engage and hold the body structures B which are desired to be walled off from the operational area. This having been done, the base portions 14 of the supporting brackets are slid outwardly to retract the blade structures, and thereby withdraw said body structures B away from the operational area desired to be exposed, whereupon the clamping devices are tightened to secure said base portions to the incisional retractor frame, and thus retain the supplementary retractor blade structures in operative retracted positions, so that said blade structures then function to hold the body structures B walled off from the exposed area of operation. It will be obvious that the supplementary retractor devices, when thus adjusted and affixed to the incisional retractor frame in applied relation to the body structures B, will hold the latter away from the operational area without necessity for further manipulation, and consequently need for use of manually held retractors by surgical assistant or assistants is eliminated, so that assistant service may be availed of for other duties and purposes.

From the above it will be understood that the instant invention provides a simple, easily manipulated, and highly efficient supplementary retractor means for use in combination with incisional retractors.

Having now described our invention, we claim:

1. A supplementary retractor device, adapted to be mounted upon an incisional retractor for disposition within the interior thereof, comprising a supporting bracket having a base, means to affix said base to the incisional retractor and a supporting post upstanding from said base, a blade structure dependent from said supporting post in a plane perpendicular to the incisional retractor and being vertically adjustable on said post, and means disposed above and exteriorly of the incisional retractor to affix said blade structure to the supporting post in selected vertically adjusted position.

2. A supplementary retractor device, adapted to be mounted upon an incisional retractor for disposition within the interior thereof, comprising a supporting bracket having a base, means to affix said base to the incisional retractor and a supporting post upstanding from said base, a blade structure dependent from said supporting post in a plane perpendicular to the incisional retractor, and including relatively adjustable blade members, means disposed above and exteriorly of the incisional retractor to affix said blade structure to the supporting post in selected vertically adjusted position, and manipulating members for said blade members also disposed above and exteriorly of the incisional retractor.

3. A supplementary retractor device, adapted to be mounted upon an incisional retractor for disposition within the interior thereof, comprising a supporting bracket having a base, means to affix said base to the incisional retractor, a vertically slotted supporting post upstanding from said base, a blade structure disposed in a plane perpendicular to the incisional retractor, said blade structure comprising a pair of superposed blade members, a carrying bolt pivotally supporting the upper end portions of said blade members whereby to suspend the same for relative lateral swinging movements, said carrying bolt extending through the slotted supporting post, and clamp nut means on said carrying bolt operative to affix the blade structure to the supporting post in selected vertically adjusted position.

4. A supplementary retractor device, adapted to be mounted upon an incisional retractor for disposition within the interior thereof, comprising a supporting bracket having a base, means to affix said base to the incisional retractor, a vertically slotted supporting post upstanding from said base, a blade structure disposed in a plane perpendicular to the incisional retractor, said blade structure comprising a pair of superposed blade members, a carrying bolt pivotally supporting the upper end portions of said blade members whereby to suspend the same for relative laterally swinging movements, a bridging blade pivotally connected to the lower end portion of one said blade member, the other blade member having a cam slot, and the free end portion of said bridging blade having a rider stud operatively engaged by said cam slot, said carrying bolt extending through the slotted supporting post, and clamp nut means on said carrying bolt operative to affix the blade structure to the supporting post in selected vertically adjusted position.

5. A supplementary retractor device as defined in claim 3 including means mounted on said carrier bolt for frictionally binding said blade members together against accidental relative displacement, and said blade members having finger pieces at their exterior exposed ends for manipulating the same.

6. A supplementary retractor device as defined in claim 4 including means mounted on said carrier bolt for frictionally binding said blade members together against accidental relative displacement, and said blade members having finger pieces at their exterior exposed ends for manipulating the same.

HARRY S. IVORY.
JACOB F. LOEFFLER.

REFERENCES CITED

The following references are of record in the file of this patent:

UNITED STATES PATENTS

| Number | Name | Date |
| --- | --- | --- |
| 497,064 | Van Meter | May 9, 1893 |
| 749,811 | Bernays | Jan. 19, 1904 |
| 1,157,202 | Bates et al. | Oct. 19, 1915 |